(12) United States Patent
Seiberlich et al.

(10) Patent No.: US 9,175,622 B2
(45) Date of Patent: Nov. 3, 2015

(54) ENGINE EMISSION CONTROL STRATEGY FOR SMOKE AND NOX

(75) Inventors: Matthew Joseph Seiberlich, Elgin, IL (US); Michael James McNulty, Lombard, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 331 days.

(21) Appl. No.: 13/641,205

(22) PCT Filed: Apr. 22, 2010

(86) PCT No.: PCT/US2010/032014
§ 371 (c)(1),
(2), (4) Date: Oct. 15, 2012

(87) PCT Pub. No.: WO2011/133153
PCT Pub. Date: Oct. 27, 2011

(65) Prior Publication Data
US 2013/0151124 A1 Jun. 13, 2013

(51) Int. Cl.
*F02D 41/00* (2006.01)

(52) U.S. Cl.
CPC .......... *F02D 41/0002* (2013.01); *F02D 41/005* (2013.01); *F02D 41/0072* (2013.01); *F02D 41/0007* (2013.01); *F02D 2250/18* (2013.01); *Y02T 10/42* (2013.01); *Y02T 10/47* (2013.01)

(58) Field of Classification Search
CPC ... F02D 41/00; F02D 41/0002; F02D 41/005; F02D 41/0072; F02D 41/3035; F02D 2041/001; F02D 2250/18; F02M 25/0727; F02M 25/56; Y02T 10/42; Y02T 10/47; Y02T 10/121

USPC .......... 701/102–105, 108; 123/299, 300, 305, 123/443, 568.11, 568.14, 568.15
See application file for complete search history.

(56) References Cited

U.S. PATENT DOCUMENTS

| | | | | |
|---|---|---|---|---|
| 5,150,694 A | * | 9/1992 | Currie et al. | 123/687 |
| 6,101,999 A | * | 8/2000 | Ohashi et al. | 123/295 |
| 6,606,981 B2 | * | 8/2003 | Itoyama | 123/568.21 |
| 6,993,428 B1 | | 1/2006 | Gundrum | |
| 7,334,561 B2 | * | 2/2008 | Neunteufl et al. | 123/295 |
| 2001/0045209 A1 | * | 11/2001 | Balekai et al. | 123/568.12 |
| 2005/0056265 A1 | * | 3/2005 | Center | 123/681 |
| 2006/0064232 A1 | * | 3/2006 | Ampunan et al. | 701/115 |
| 2009/0132153 A1 | * | 5/2009 | Shutty et al. | 701/108 |
| 2009/0143959 A1 | * | 6/2009 | Yamaoka et al. | 701/108 |
| 2012/0191325 A1 | * | 7/2012 | Haskara et al. | 701/104 |
| 2013/0080026 A1 | * | 3/2013 | Kang et al. | 701/102 |

\* cited by examiner

*Primary Examiner* — John Kwon
*Assistant Examiner* — Johnny H Hoang
(74) *Attorney, Agent, or Firm* — Jeffrey P. Calfa; Mark C. Bach

(57) ABSTRACT

An engine control system (32) apportions smoke and NOx in engine-out exhaust gas by a strategy (38) that corrects a target percentage for fresh air and a target percentage for exhaust gas to re-calculate a set-point for fresh air mass flow. The target percentage for fresh air mass flow is calculated as a function of engine speed (N) and an engine output torque request (TQI_DRIV).

18 Claims, 2 Drawing Sheets

ENGINE EMISSION CONTROL STRATEGY FOR SMOKE AND NOX

TECHNICAL FIELD

This disclosure relates to internal combustion engines that propel motor vehicles, especially compression ignition (i.e. diesel) engines, and in particular it relates an emission control strategy for relatively apportioning both engine-out smoke and engine-out NOx during engine transients.

BACKGROUND OF THE DISCLOSURE

Primary control of the torque output of a motor vehicle engine is performed by an accelerator input to an engine control system. The accelerator input may come from an accelerator position sensor (APS) operated by an accelerator pedal. The control system processes the accelerator input as an engine output torque request that is a function of accelerator pedal position. The more the pedal is depressed, the larger the torque request.

The torque request is processed by the engine control system as an element of overall engine control strategy which includes controlling engine operation in ways that enable the engine to comply with relevant tailpipe emission standards. In other words, while the control strategy seeks to operate the engine in accordance with the torque request, operation is controlled in coordination with a tailpipe emission control strategy.

Smoke and NOx are constituents of engine exhaust gas. "Engine-out" exhaust gas is exhaust gas that comes from the engine cylinders and into an exhaust manifold before entering an engine exhaust system. "Tailpipe-out" exhaust gas is exhaust gas that enters the surrounding atmosphere after having passed through the exhaust system. For any of various reasons, the quantities of various constituents in tailpipe-out exhaust gas may not be the same as in engine-out exhaust gas. For example, an exhaust system may include after-treatment, and engine-out exhaust gas may include some unburned fuel that is combusted in the exhaust system for exhaust after-treatment. NOx is typically controlled by controlling exhaust gas recirculation. Smoke, which comprises mostly particulate matter, is typically controlled by controlling air/fuel ratio.

The dynamic nature of motor vehicle engine operation, i.e. accelerations and decelerations, gives rise to transients that impact an engine control strategy and can change the proportions of constituents in engine-out exhaust gas in ways that affect compliance with tailpipe emission regulations.

SUMMARY OF THE DISCLOSURE

This disclosure relates to a strategy that is effective during an engine transient for re-calculating a set-point for fresh air mass flow and for changing engine fueling as appropriate to relatively apportion smoke or NOx in engine-out exhaust gas without creating an excess of either. The strategy can be calibrated, as appropriate, to relatively apportion the quantities of smoke and NOx within maximum limits for each without creating an excess of either. For example, NOx may be somewhat reduced at the expense of somewhat more smoke, and vice versa.

A general aspect of the present disclosure relates to a compression ignition engine comprising engine cylinders within which combustion of fuel occurs to operate the engine, an intake system for introducing fresh air into the engine cylinders, a fueling system for introducing fuel into the engine cylinders for combustion with the fresh air, an exhaust manifold into which the engine cylinders deliver exhaust gas created by combustion of fuel in the engine cylinders, an exhaust system for conveying exhaust gas from the exhaust manifold to atmosphere, an EGR system for diverting some of the exhaust gas coming from the exhaust manifold to mix with fresh air coming from the intake system and form an air/exhaust mixture that enters the engine cylinders through the intake manifold, and a control system for processing data to control certain aspects of engine operation.

The control system comprises a strategy: for calculating the difference between actual mass flow of the air/exhaust mixture that enters the engine cylinders and a set-point for fresh air mass flow calculated by the control system and then dividing the difference by the actual mass flow of the air/exhaust mixture that enters the engine cylinders to yield a target percentage for exhaust gas in the air/exhaust mixture while imposing both a maximum limit and a minimum limit on the target percentage for exhaust gas in the air/exhaust mixture; for dividing the multiplication product of an engine output torque request and a minimum air/fuel ratio that is a function of engine speed and the engine output torque request by the actual mass flow of the air/exhaust mixture that enters the engine cylinders to yield a target percentage for fresh air in the air/exhaust mixture; for correcting the target percentage for fresh air and the target percentage for exhaust gas to relatively apportion smoke and NOx in exhaust gas entering the exhaust system from the exhaust manifold as a function of the target percentage for fresh air and the target percentage for exhaust gas; and for using the corrected target percentage for fresh air to re-calculate the set-point for fresh air mass flow.

Another general aspect of the present disclosure relates to a method for apportioning smoke and NOx in engine-out exhaust gas from a compression ignition engine.

The method comprises: calculating the difference between actual mass flow of an air/exhaust mixture that enters the cylinders of the engine and a calculated set-point for fresh air mass flow into the cylinders and then dividing the difference by the actual mass flow of the air/exhaust mixture that enters the cylinders to yield a target percentage for exhaust gas in the air/exhaust mixture while imposing both a maximum limit and a minimum limit on the target percentage for exhaust gas in the air/exhaust mixture; dividing the multiplication product of an engine output torque request and a minimum air/fuel ratio that is a function of engine speed and the engine output torque request by the actual mass flow of the air/exhaust mixture that enters the cylinders to yield a target percentage for fresh air in the air/exhaust mixture; correcting the target percentage for fresh air and the target percentage for exhaust gas to relatively apportion smoke and NOx in engine-out exhaust gas as a function of the target percentage for fresh air and the target percentage for exhaust gas; and using the corrected target percentage for fresh air to re-calculate the set-point for fresh air mass flow.

The foregoing summary, accompanied by further detail of the disclosure, will be presented in the Detailed Description below with reference to the following drawings that are part of this disclosure.

DETAILED DESCRIPTION

Figure 1:
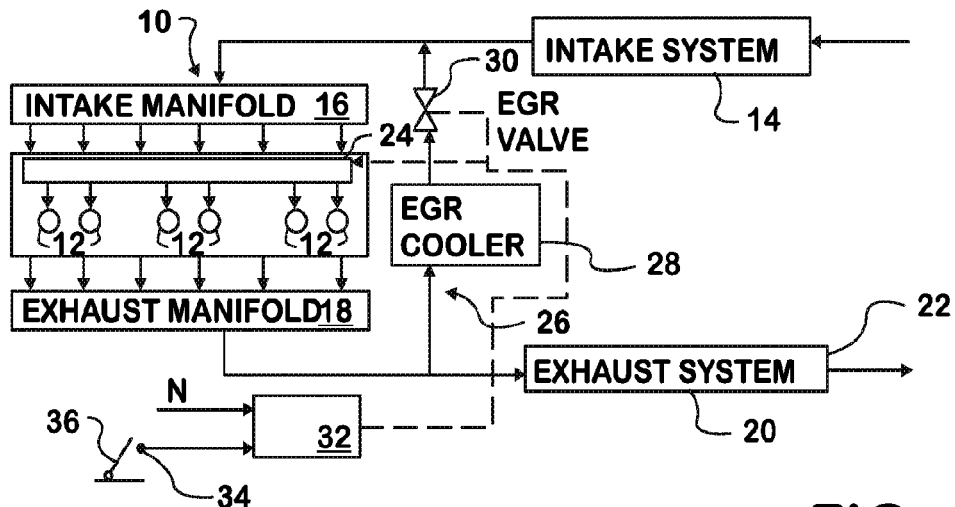
FIG. 1 is a schematic diagram of portions of a diesel engine relevant to the present disclosure.

FIG. 1 shows a turbocharged diesel engine 10 that comprises engine cylinders 12 within which combustion of fuel causes pistons (not shown) to reciprocate. Each piston is coupled to a respective throw of a crankshaft (not shown) by a corresponding connecting rod (not shown). Engine 10 further comprises: an intake system 14 through which fresh air passes to an engine intake manifold 16; an engine exhaust manifold 18 for collecting exhaust gases resulting from combustion of fuel in engine cylinders 12 for ensuing passage through an engine exhaust system 20 to a tailpipe 22 from which the gases exit to the surrounding atmosphere; and a fueling system 24 comprising fuel injectors for introducing fuel into engine cylinders 12 for combustion with fresh air.

Engine intake system 14 comprises other elements, including a turbocharger compressor, an intake throttle, a charge air cooler, and an intake air filter that are not specifically shown in FIG. 1. Engine exhaust system 20 comprises other elements, including a turbocharger turbine for operating the intake system compressor and one or more after-treatment devices that also are not specifically shown in FIG. 1.

Engine 10 further comprises an EGR (exhaust gas recirculation) system 26 shown by way of example to comprise an EGR cooler 28 and an EGR valve 30. When EGR valve 30 is open, some of the exhaust gas coming from exhaust manifold 18 is diverted from exhaust system 20 to mix with fresh air coming from intake system 14 and form an air/exhaust mixture that enters engine cylinders 12 through intake manifold 16.

A processor-based engine control system comprises an ECU (engine control unit) 32 that processes data from various sources to develop data for various parameters that serve to control various aspects of engine operation, such as EGR valve 30 and fueling system 24. The data processed by ECU 32 may originate at external sources, such as various sensors, and/or be generated internally.

One input to ECU 32 is that of an accelerator position sensor (APS) 34 operated by an accelerator pedal 36 to request engine output torque. Another input is engine speed N. One parameter for which ECU 32 develops data is a set-point for fresh air mass flow designated by a parameter MAF_SP_MMV. The value for MAF_SP_MMV may be calculated in any suitably appropriate way, such as by averaging several recent calculations to create a mean moving value (mmv) for the parameter.

When engine 10 is running in essentially a steady-state condition, meaning that engine speed and engine load are both essentially constant, set-point MAF_SP_MMV is essentially constant. Engine fueling too is substantially constant. A change in any of several different inputs to engine 10 may initiate a transient that when concluded, results in a new and different data value for MAF_SP_MMV, and a corresponding change in fueling.

During a transient, the processing of data will continually update MAF_SP_MMV, but depending on the severity of the transient, the inability of engine components to respond fast enough as the transient proceeds may create some degree of disparity between a calculated data value for the MAF_SP_MMV and a data value that would provide a more appropriate value given the nature of the event.

Engine transients have implications on various aspects of engine performance. For example, they may have the potential to cause poor acceleration, spikes in certain exhaust gas emission constituents, engine misfire, and/or undesirable noise.

One example of an input that can initiate an engine transient is accelerator pedal position. When a driver depresses accelerator pedal 36 to request acceleration via operation of APS 34, ECU 32 responds by increasing boost thereby increasing the fresh air mass flow. When the driver releases accelerator pedal 36, ECU 32 responds by reducing boost thereby reducing the fresh air mass flow. Because engine 10 cannot respond instantaneously to the input change, it responds transiently.

Another example of an input that can initiate a transient is a change in engine load. A change in engine load can originate on-board the vehicle, for example when the load imposed on the engine by an engine-driven accessory changes, or externally of the vehicle. For example, if a vehicle that is running on a horizontal road surface at a constant speed with its engine operating in essentially a steady-state condition encounters a sudden headwind or a hill, engine load will increase, initiating a transient.

Figure 2B:
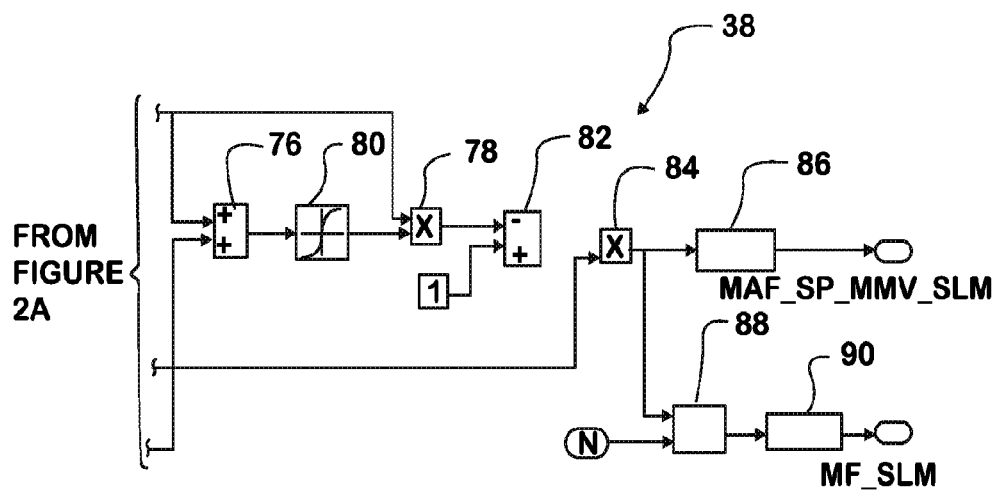
FIGS. 2A and 2B collectively form a schematic diagram of a software strategy that is present in a control system shown in the diagram of FIG. 1.
Figure 2A:
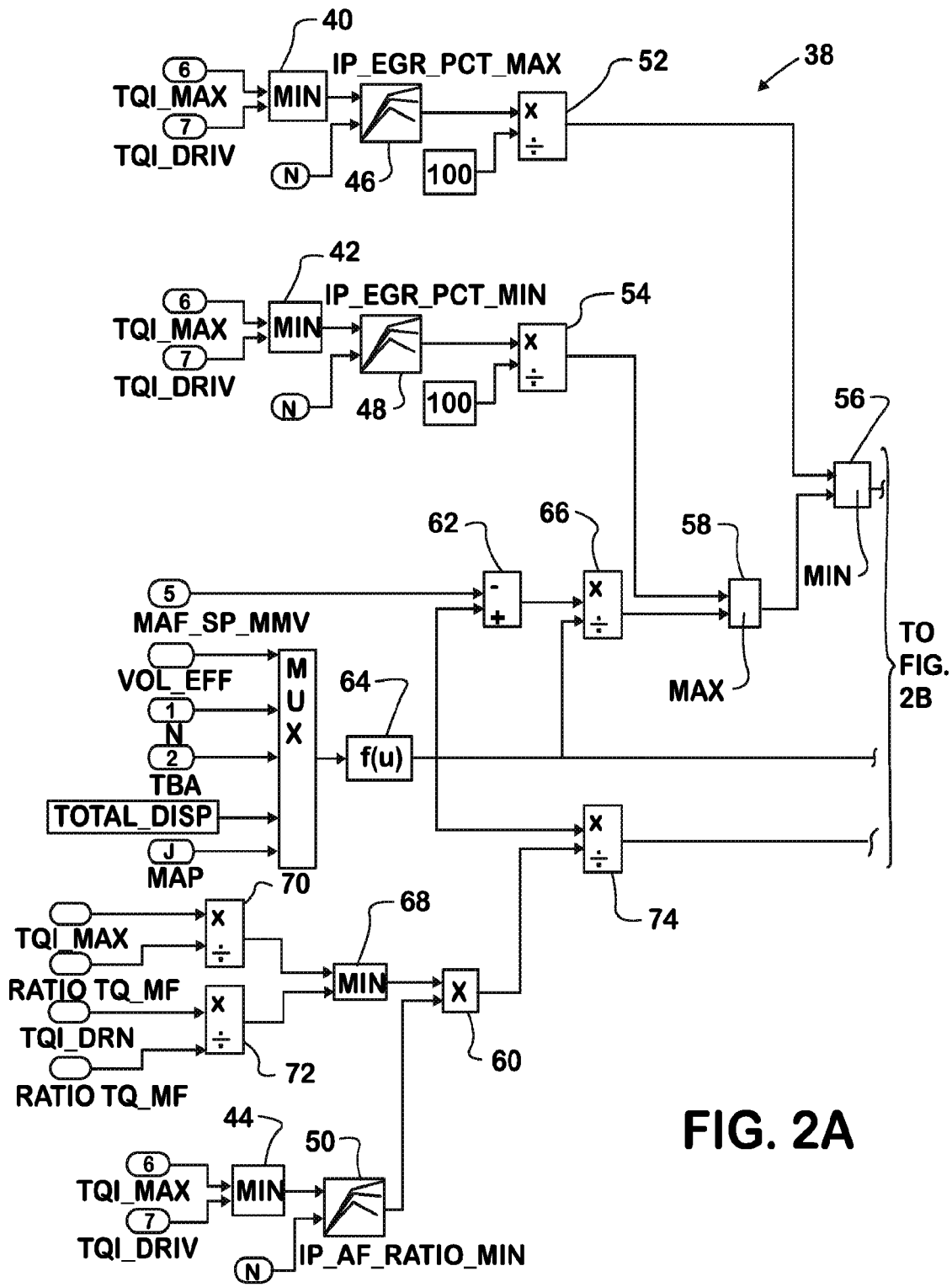

FIGS. 2A and 2B disclose a strategy 38 that is effective during an engine transient for re-calculating set-point MAF_SP_MMV and changing engine fueling as appropriate to the set-point without creating an excess of either smoke or NOx in engine-out exhaust gas.

A parameter TQI_MAX represents a torque to which engine torque is to be limited. A parameter TQI_DRIV represents a driver torque request from APS 34 based on driver operation of pedal 36. While any given quantity of engine fueling produces a corresponding engine torque, a parameter RATIO_TQ_MF_GRD represents a ratio of torque to engine fueling that accounts for a quantity of fuel for producing the requested engine output torque while the total quantity of fuel introduced is greater by an amount that remains unburned in engine-out exhaust but subsequently combusts in engine exhaust system 20 for exhaust after-treatment.

Functions 40, 42, and 44 provide for an engine output torque request (parameter TQI_DRIV) to respective look-up tables, or maps, 46, 48, and 50 to be maximally limited to TQI_MAX. Engine speed N is another input to each look-up table 46, 48, 50.

Look-up table 46 contains data values for a parameter IP_EGR_PCT_MAX, each correlated with a respective set of data values for engine speed and requested engine torque.

Look-up table 48 contains data values for a parameter IP_EGR_PCT_MIN, each correlated with a respective set of data values for engine speed and requested engine torque.

Look-up table 50 contains data values for a parameter IP_AF_RATIO_MIN, each correlated with a respective set of data values for engine speed and requested engine torque.

Based on data values for engine speed and requested engine torque, ECU 32 selects from each look-up table 46, 48, 50 the correlated data value for IP_EGR_PCT_MAX, IP_EGR_PCT_MIN, and IP_AF_RATIO_MIN respectively. A respective function 52, 54 converts IP_EGR_PCT_MAX, and IP_EGR_PCT_MIN into a respective EGR percentage (expressed as a positive fraction).

The EGR percentage from function 52 is one input to a minimum selection function 56. The EGR percentage from function 54 is one of two inputs to a maximum selection function 58 whose output is the other input to function 56. The selected minimum air/fuel ratio from look-up table 50 is one input to a multiplication function 60.

Set-point MAF_SP_MMV is one input to a subtraction function 62. The other input to function 62 is a data value representing mass flow of the air/exhaust mixture entering engine cylinders 12 as calculated by a speed/density calculation function 64 based on parameters that are commonly used to perform such calculation. As noted before, the mass flow into cylinders 12 comprises two components: the fresh air that has entered through intake system 14 and exhaust gas that has passed through EGR system 26 to entrain with the fresh air.

The subtraction performed by function 62 presumes the mass flow entering cylinders 12 to be positive and set-point MAF_SP_MMV to be positive, and consequently provides an output whose value is the difference between the two, a value that may be either positive or negative. The output of function 62 is a numerator input to a function 66 while the output of function 64 is a denominator input to function 66. The output of function 66 is another of the two inputs to function 58.

The output of a function 68 is another of the two inputs to function 60. The output of function 68 represents a quantity of fuel that will produce engine output torque satisfying a driver torque request. Alternate sources 70 and 72 for that data are shown, and function 68 selects the smaller of the two. If a single source were relied on, it would be a direct input to function 60.

The output of function 60 is a numerator input to a function 74. The output of function 64 is a denominator input to function 74.

The output of function 56 is one of two inputs to a summing function 76, and the output of function 74 is the other input. The output of function 56 is also one of two inputs to a multiplication function 78. The output of function 76 is an input to a conversion function 80, and the output of function 80 is the other input to function 78.

The output of function 78 is one of two inputs to a subtraction function 82 whose other input is a constant having a value of unity, i.e. one. The output of function 82 is one of two inputs to a multiplication function 84. The output of function 64 is the other input to function 84.

The output of function 66 represents a calculation of the actual mass percentage of recirculated exhaust gas in the mixture entering engine cylinders 12. If that percentage is not less than a minimum percentage provided by functions 48, 54 and not greater than a maximum percentage provided by functions 46, 54, it becomes the input to both function 76 and function 78. If the calculated actual percentage of the recirculated exhaust gas is less than a minimum percentage provided by function 48, 54 then that minimum percentage provided by functions 48, 54 becomes the input to both function 76 and function 78. If the calculated actual percentage is greater than a maximum percentage provided by functions 46, 52, then that maximum percentage provided by functions 46, 52 becomes the input to both function 76 and function 78.

Function 50 sets a minimum air/fuel ratio that is a function of driver-requested engine output torque (subject to being maximally limited to TQI_MAX) and engine speed N. By processing that ratio with driver-requested engine output torque, function 60 provides a data value for fresh air mass flow. Function 74 divides that data value by the actual mass flow of air/exhaust mixture entering cylinders 12 as calculated by function 64 to yield a corresponding percentage (expressed as a fraction). Function 76 sums that percentage and the percentage of EGR from function 56 to create an input to function 80.

Function 80 provides a data value that is then used to calculate a data value for a parameter MAF_SP_MMV_SLM that represents an updated, re-calculated value for MAF_SP_MMV.

Regardless of whether the calculation performed by function 62 results in a positive, negative, or zero value, the selection made by function 58 will not be negative, and consequently neither will the selection made by function 56.

The value selected by function 56 represents a target EGR percentage in the mixture entering cylinders 12. The value calculated by function 74 represents a target mass percentage of fresh air in the mixture entering cylinders 12 for satisfying a minimum air/fuel ratio target. The summation performed by function 76 will lie within a range that includes 100% (expressed fractionally, such as 98/100 or 102/100 for example).

Function 80 is defined by a look-up table containing values for correction factors correlated possible values for the summation of the target EGR value and the target air value. The summation performed by function 76 is used to select a correction factor from the function 80 look-up table. Then the selected correction factor is used by function 78 to calculate a corrected target EGR percentage by multiplying the target EGR percentage provided by function 56 by the selected value from function by the look-up table. In this way EGR is corrected according to a selected calibration established by the values chosen to populate the look-up table for relatively apportioning NOx and smoke. Those populating values may be determined empirically, such as by dynamometer testing during engine development.

Then by subtracting the corrected target EGR percentage from unity, function 82 calculates a corrected fresh air mass flow percentage. Actual fresh air mass flow is calculated by function 84, and function 86 converts that value into the updated value for MAF_SP_MMV_SLM.

The calculation by function 84 that is converted to the re-calculate the set-point for fresh air mass flow by function 86, is one input to a look-up table 88. Engine speed N is another input. The two inputs select a maximum limit for engine fueling from look-up table 88 which is populated with maximum fueling limits, each correlated with a respective set of values for a set-point for fresh air mass flow and engine speed. That maximum fueling limit is imposed on fueling system 24 by a function 90 that converts it to a parameter MF_SLM.

Although strategy 38 calculates a target EGR percentage, that target EGR percentage is not necessarily directly used in whatever EGR control strategy is embodied in control system 32.

What is claimed is:

1. A compression ignition engine comprising:
engine cylinders within which combustion of fuel occurs to operate the engine;
an intake system for introducing fresh air into the engine cylinders;
a fueling system for introducing fuel into the engine cylinders for combustion with the fresh air;
an exhaust manifold into which the engine cylinders deliver exhaust gas created by combustion of fuel in the engine cylinders;
an exhaust system for conveying exhaust gas from the exhaust manifold to atmosphere;
an EGR system for diverting some of the exhaust gas coming from the exhaust manifold to mix with fresh air coming from the intake system and form an air/exhaust mixture that enters the engine cylinders through the intake manifold; and
a control system for processing data to control certain aspects of engine operation and comprising a strategy: for calculating the difference between actual mass flow of the air/exhaust mixture that enters the engine cylinders and a set-point for fresh air mass flow calculated by the control system and then dividing the difference by the actual mass flow of the air/exhaust mixture that enters the engine cylinders to yield a target percentage for exhaust gas in the air/exhaust mixture while imposing both a maximum limit and a minimum limit on the target percentage for exhaust gas in the air/exhaust mixture; for dividing the multiplication product of an engine output torque request and a minimum air/fuel ratio that is a function of engine speed and the engine output torque request by the actual mass flow of the air/exhaust mixture that enters the engine cylinders to yield a target percentage for fresh air in the air/exhaust mixture; for correcting the target percentage for fresh air and the target percentage for exhaust gas to relatively apportion smoke and NOx in exhaust gas entering the exhaust system from the exhaust manifold as a function of the target percentage for fresh air and the target percentage for exhaust gas; and for using the corrected target percentage for fresh air to re-calculate the set-point for fresh air mass flow.

2. A compression ignition engine as set forth in claim 1 in which the control system strategy for correcting the target percentage for fresh air and the target percentage for exhaust gas to relatively apportion smoke and NOx in exhaust gas entering the exhaust system from the exhaust manifold as a function of the target percentage for fresh air and the target percentage for exhaust gas comprises summing the target percentage for fresh air and the target percentage for exhaust gas, selecting a correction factor from a lookup table containing correction factors, each correlated with a respective sum of a target percentage for fresh air and a target percentage for exhaust gas, and applying the selected correction factor to the target percentage for exhaust gas to yield a corrected target percentage for exhaust gas.

3. A compression ignition engine as set forth in claim 2 in which the control system strategy for applying the selected correction factor to the target percentage for exhaust gas to yield a corrected target percentage for exhaust gas multiplies the target percentage for exhaust gas by the selected correction factor to yield the corrected target percentage for exhaust gas, then subtracts the corrected target percentage for exhaust gas from unity to yield a difference, and then multiplies the target percentage for fresh air by the difference to yield the corrected target percentage for fresh air.

4. A compression ignition engine as set forth in claim 1 in which the control system strategy for imposing both a maximum limit and a minimum limit on the target percentage for exhaust gas in the air/exhaust mixture comprises selecting from a maximum EGR look-up table that is populated with maximum EGR percentages, each correlated with a respective set of values for engine output torque and engine speed, a maximum EGR percentage as a function of an engine output torque request and engine speed, and using the selected maximum EGR percentage as the maximum limit on the target percentage for exhaust gas in the air/exhaust mixture, and selecting from a minimum EGR look-up table that is populated with minimum EGR percentages, each correlated with a respective set of values for engine output torque and engine speed, a minimum EGR percentage as a function of the engine output torque request and engine speed, and using the selected minimum EGR percentage as the minimum limit on the target percentage for exhaust gas in the air/exhaust mixture.

5. A compression ignition engine as set forth in claim 4 in which the engine output torque request is issued by an accelerator pedal position sensor that senses operating position of an accelerator pedal.

6. A compression ignition engine as set forth in claim 1 in which the control system strategy for dividing the multiplication product of an engine output torque request and a minimum air/fuel ratio that is a function of engine speed and the engine output torque request by the actual mass flow of the air/exhaust mixture that enters the engine cylinders to yield a target percentage for fresh air in the air/exhaust mixture comprises selecting the minimum air/fuel ratio from an air/fuel ratio look-up table that is populated with air/fuel ratios, each correlated with a respective set of values for engine output torque and engine speed, as a function of an engine output torque request and engine speed.

7. A compression ignition engine as set forth in claim 6 in which the engine output torque request is issued by an accelerator pedal position sensor that senses operating position of an accelerator pedal.

8. A compression ignition engine as set forth in claim 1 in which the control system strategy further comprises calculating a maximum limit for engine fueling as a function of the re-calculated set-point for fresh air mass flow and imposing the maximum limit for engine fueling on the fueling system.

9. A compression ignition engine as set forth in claim 8 in which the control system strategy for calculating a maximum limit for engine fueling as a function of the re-calculated set-point for fresh air mass flow comprises selecting a maximum limit for engine fueling from a maximum fueling limit look-up table that is populated with maximum fueling limits, each correlated with a respective set of values for a set-point for fresh air mass flow and engine speed, as a function of the re-calculated set-point for fresh air mass flow and engine speed.

10. A method for apportioning smoke and NOx in engine-out exhaust gas from a compression ignition engine comprising:
   calculating the difference between actual mass flow of an air/exhaust mixture that enters the cylinders of the engine and a calculated set-point for fresh air mass flow into the cylinders and then dividing the difference by the actual mass flow of the air/exhaust mixture that enters the cylinders to yield a target percentage for exhaust gas in the air/exhaust mixture while imposing both a maximum limit and a minimum limit on the target percentage for exhaust gas in the air/exhaust mixture;
   dividing the multiplication product of an engine output torque request and a minimum air/fuel ratio that is a function of engine speed and the engine output torque request by the actual mass flow of the air/exhaust mixture that enters the cylinders to yield a target percentage for fresh air in the air/exhaust mixture;
   correcting the target percentage for fresh air and the target percentage for exhaust gas to relatively apportion smoke and NOx in engine-out exhaust gas as a function of the target percentage for fresh air and the target percentage for exhaust gas;
   and using the corrected target percentage for fresh air to re-calculate the set-point for fresh air mass flow.

11. A method as set forth in claim 10 in correcting the target percentage for fresh air and the target percentage for exhaust gas to relatively apportion smoke and NOx in exhaust gas entering the exhaust system from the exhaust manifold as a function of the target percentage for fresh air and the target percentage for exhaust gas comprises:
   summing the target percentage for fresh air and the target percentage for exhaust gas, selecting a correction factor from a look-up table containing correction factors, each correlated with a respective sum of a target percentage for fresh air and a target percentage for exhaust gas, and applying the selected correction factor to the target percentage for exhaust gas to yield a corrected target percentage for exhaust gas.

12. A method as set forth in claim 11 in which applying the selected correction factor to the target percentage for exhaust gas to yield a corrected target percentage for exhaust gas is performed by multiplying the target percentage for exhaust gas by the selected correction factor to yield the corrected target percentage for exhaust gas, then subtracting the corrected target percentage for exhaust gas from unity to yield a difference, and then multiplying the target percentage for fresh air by the difference to yield the corrected target percentage for fresh air.

13. A method as set forth in claim 10 in which imposing both a maximum limit and a minimum limit on the target percentage for exhaust gas in the air/exhaust mixture comprises:
selecting from a maximum EGR look-up table that is populated with maximum EGR percentages, each correlated with a respective set of values for engine output torque and engine speed, a maximum EGR percentage as a function of an engine output torque request and engine speed, and using the selected maximum EGR percentage as the maximum limit on the target percentage for exhaust gas in the air/exhaust mixture;
and selecting from a minimum EGR look-up table that is populated with minimum EGR percentages, each correlated with a respective set of values for engine output torque and engine speed, a minimum EGR percentage as a function of the engine output torque request and engine speed, and using the selected minimum EGR percentage as the minimum limit on the target percentage for exhaust gas in the air/exhaust mixture.

14. A method as set forth in claim 13 comprising issuing the engine output torque request by operating an accelerator pedal position sensor by operating an accelerator pedal.

15. A method as set forth in claim 10 in which dividing the multiplication product of an engine output torque request and a minimum air/fuel ratio that is a function of engine speed and the engine output torque request by the actual mass flow of the air/exhaust mixture that enters the engine cylinders to yield a target percentage for fresh air in the air/exhaust mixture comprises:
selecting the minimum air/fuel ratio from an air/fuel ratio look-up table that is populated with air/fuel ratios, each correlated with a respective set of values for engine output torque and engine speed, as a function of an engine output torque request and engine speed.

16. A method as set forth in claim 15 comprising issuing the engine output torque request by operating an accelerator pedal position sensor by operating an accelerator pedal.

17. A method as set forth in claim 10 further comprising calculating a maximum limit for engine fueling as a function of the re-calculated set-point for fresh air mass flow and imposing the maximum limit for engine fueling on the fueling system.

18. A method as set forth in claim 17 in which calculating a maximum limit for engine fueling as a function of the re-calculated set-point for fresh air mass flow comprises:
selecting a maximum limit for engine fueling from a maximum fueling limit look-up table that is populated with maximum fueling limits, each correlated with a respective set of values for a set-point for fresh air mass flow and engine speed, as a function of the re-calculated set-point for fresh air mass flow and engine speed.

* * * * *